(12) United States Patent
Riley

(10) Patent No.: US 9,433,918 B2
(45) Date of Patent: Sep. 6, 2016

(54) METHOD OF MAKING DIATOMACEOUS EARTH GRANULATE

(75) Inventor: Andrew Riley, Cornwall (GB)

(73) Assignee: Imerys Minerals Limited, Par Cornwall (GB)

( * ) Notice: Subject to any disclaimer, the term of this patent is extended or adjusted under 35 U.S.C. 154(b) by 39 days.

(21) Appl. No.: 14/234,852

(22) PCT Filed: Jul. 25, 2012

(86) PCT No.: PCT/GB2012/051785
§ 371 (c)(1),
(2), (4) Date: Aug. 15, 2014

(87) PCT Pub. No.: WO2013/014450
PCT Pub. Date: Jan. 31, 2013

(65) Prior Publication Data
US 2014/0371061 A1    Dec. 18, 2014

(30) Foreign Application Priority Data

Jul. 27, 2011 (GB) .................................. 1112938.4

(51) Int. Cl.
| | |
|---|---|
| *B01J 2/16* | (2006.01) |
| *B01J 20/14* | (2006.01) |
| *B01J 20/28* | (2006.01) |
| *B01J 20/30* | (2006.01) |
| *B01D 15/12* | (2006.01) |
| *C09C 1/30* | (2006.01) |
| *B01D 15/00* | (2006.01) |

(52) U.S. Cl.
CPC ............... *B01J 20/14* (2013.01); *B01D 15/00* (2013.01); *B01D 15/125* (2013.01); *B01J 20/2803* (2013.01); *B01J 20/28004* (2013.01); *B01J 20/28021* (2013.01); *B01J 20/3007* (2013.01); *B01J 20/3042* (2013.01); *B01J 20/3078* (2013.01); *C09C 1/3027* (2013.01); *C09C 1/3036* (2013.01); *C01P 2004/03* (2013.01); *C01P 2006/10* (2013.01); *C01P 2006/12* (2013.01); *C01P 2006/17* (2013.01)

(58) Field of Classification Search
CPC ............ B01J 2/16; C01B 33/32; C11D 3/08; B01D 9/00; C13K 1/10
USPC .......................................... 23/313 AS, 295 R
See application file for complete search history.

(56) References Cited

U.S. PATENT DOCUMENTS

| | | | |
|---|---|---|---|
| 3,915,735 | A | 10/1975 | Moreland |
| 4,260,498 | A | 4/1981 | Sample, Jr. et al. |
| 2003/0203815 | A1 | 10/2003 | Khare et al. |
| 2006/0207932 | A1 | 9/2006 | Hajek et al. |
| 2009/0321321 | A1 | 12/2009 | Long et al. |
| 2010/0248593 | A1 | 9/2010 | Sakai et al. |

FOREIGN PATENT DOCUMENTS

| | | |
|---|---|---|
| CN | 1217228 A | 5/1999 |
| FR | 2 586 588 A1 | 3/1987 |
| GB | 949724 | 2/1964 |
| JP | 54 024289 | 2/1979 |
| JP | HO 5-228364 A | 9/1993 |
| WO | WO 2010/042614 A1 | 4/2010 |
| WO | WO 2013/014450 A1 | 1/2013 |

OTHER PUBLICATIONS

Bear, J. "The Equation of Motion of a Homogeneous Fluid: Derivations of Darcy's Law," in Dynamics of Fluids in Porous Media, American Elsevier Publishing Company, Inc., 1988, pp. 161-177.
International Search Report and Written Opinion issued Dec. 18, 2012, in International Application No. PCT/GB2012/051785.
Search Reported issued Apr. 30, 2012, in related UK Patent Application No. GB1112983.4.
Search Reported issued Nov. 28, 2011, in related UK Patent Application No. GB1112983.4.

*Primary Examiner* — Edward Johnson
(74) *Attorney, Agent, or Firm* — Finnegan, Henderson, Farabow, Garrett & Dunner LLP

(57) ABSTRACT

A method of making a diatomaceous earth granulate may include spray-drying a suspension including particles of diatomaceous earth, a liquid medium, and a binder, wherein inorganic solids in the suspension include at least 80 wt % diatomaceous earth. The method may further include recovering a diatomaceous earth spray-dried granulate. A granular diatomaceous earth product obtained by the method may include substantially spherical granules, each having a shell including diatomaceous earth surrounding a hollow core. The product may be used as a filter aid or in filtration.

22 Claims, 7 Drawing Sheets

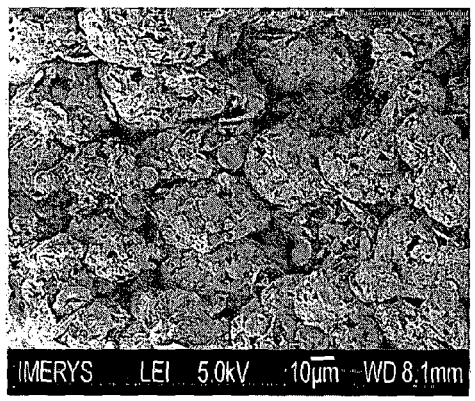 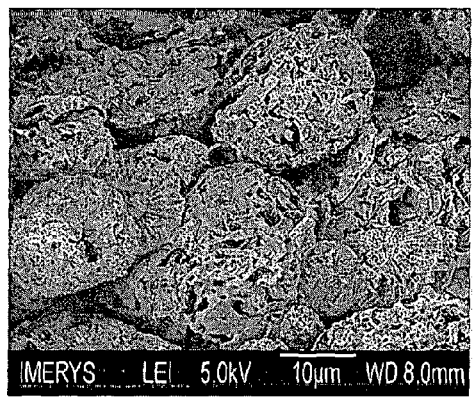
FIG. 9a  FIG. 9b
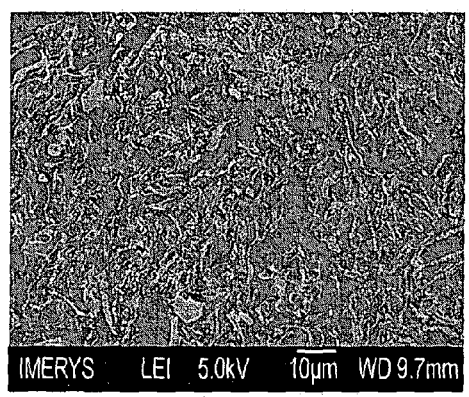
FIG. 10

METHOD OF MAKING DIATOMACEOUS EARTH GRANULATE

CLAIM FOR PRIORITY

This application is a U.S. national phase entry under 35 U.S.C. §371 from PCT International Application No. PCT/GB2012/051785, filed Jul. 25, 2012, which claims the benefit of priority of Great Britain Patent Application No. 1112938.4, filed Jul. 27, 2011, the subject matter of both of which is incorporated herein by reference.

FIELD OF THE APPLICATION

The present invention relates to diatomaceous earth products, methods of making diatomaceous earth products, and uses of the diatomaceous earth products, in particular use in filtration methods.

BACKGROUND OF THE INVENTION

Diatomaceous earth products are obtained from diatomaceous earth (also called "DE" or "diatomite"), which is generally known as a sediment enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures comprising two valves that, in the living diatom, fit together much like a pill box.

In the field of filtration, methods of particle separation from fluids may employ diatomaceous earth products as filter aids. The intricate and porous structure unique to diatomaceous earth may, in some instances, be effective for the physical entrapment of particles in filtration processes. It is known to employ diatomaceous earth products to improve the clarity of fluids that exhibit turbidity or contain suspended particles or particulate matter.

Diatomaceous earth may be used in various embodiments of filtration. As a part of pre-coating, diatomaceous earth products may be applied to a filter septum to assist in achieving, for example, any one or more of: protection of the septum, improvement in clarity, and expediting filter cake removal. As a part of body feeding, diatomaceous earth may be added directly to a fluid being filtered to assist in achieving, for example, either or both of: increases flow rate and extensions of the filtration cycle. Depending on the requirements of the specific separation process, diatomaceous earth may be used in multiple stages or embodiments including, but not limited to, in pre-coating and in body feeding.

Diatomaceous earth products are generally made by processing very finely divided diatomaceous earth, including the diatomaceous earth ore. For example, in order to obtain a product suitable for use as a filter aid, finely divided diatomaceous earth may be granulated in an agglomeration process. One suitable agglomeration process is described in US 2010/0248593.

SUMMARY OF THE INVENTION

According to the invention, there is provided a method of making a diatomaceous earth granulate, comprising:
spray-drying a suspension comprising particles of diatomaceous earth, a liquid medium and a binder, wherein the inorganic solids in the suspension comprise at least 80 wt % diatomaceous earth; and
recovering a diatomaceous earth spray-dried granulate.

In an embodiment, the spray-dried granulate may be calcined at elevated temperature to obtain granules which have the necessary structural strength to be used in, for example, filtration. Alternatively, in another embodiment, a suitable binder may be employed which provides the granules with the necessary strength without the need for calcining. Therefore, in this embodiment, the granules are not subjected to a high temperature calcining step.

In another embodiment, the spray-dried granules are formed into a suitable shaped body, prior to calcining, and then calcined to form a shaped diatomaceous earth product which may, for example, be used in filtration.

The invention also provides the diatomaceous earth granulate as well as the shaped diatomaceous earth products obtained by the methods of the present invention.

The invention also provides the use of the diatomaceous earth granular and shaped products in filtration.

The diatomaceous earth products of the invention have improved filtration performance compared to known diatomaceous earth filter aids.

BRIEF DESCRIPTION OF THE DRAWINGS

FIGS. 9a and 9b are electromicrographs of fractured surface cross-sections of the shaped body of Example 11.

FIG. 10 is an electromicrograph of the embedded polished cross-section of the shaped body of Example 11.

DETAILED DESCRIPTION OF THE INVENTION

Figure 1:
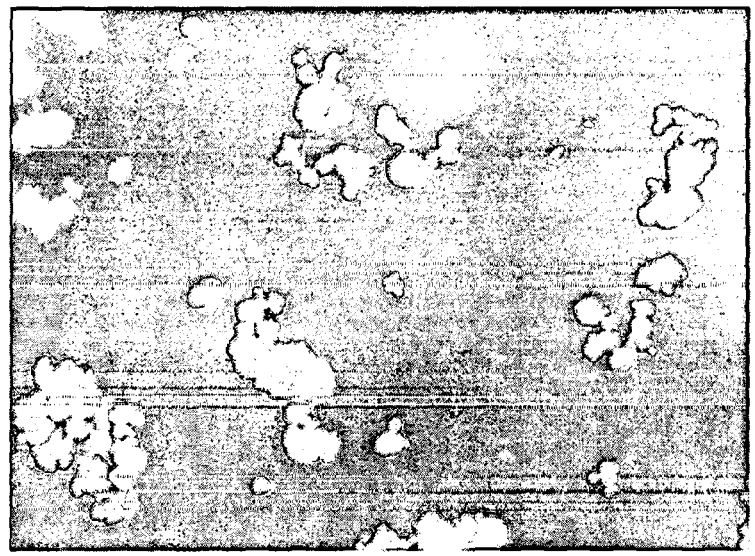
FIG. 1 is an image of the spray dried granulate of diatomaceous earth obtained in Example 4.

The present invention provides a method of making a diatomaceous earth granulate. The process comprises a step in which a suspension comprising particles of diatomaceous earth is spray-dried. A diatomaceous earth spray-dried granulate is recovered. The recovered granulate may be heat treated (also referred to herein as "calcined"). As an optional step, the granulate may be formed into a shaped body prior to heat treatment to result in a shaped diatomaceous earth product.

The suspension for spray-drying comprises at least 80% particulate diatomaceous earth based on the total weight of the inorganic solids in the suspension, for example at least 90%, or for example at least 95 wt % particulate diatomaceous earth based on the total weight of the inorganic solids. In an embodiment, the inorganic solids consist essentially of particulate diatomaceous earth.

Diatomaceous Earth

The particulate diatomaceous earth material which is used as starting material in the methods of the present invention is typically a natural diatomaceous earth, which may be obtained from a saltwater source or from a freshwater source. The diatomaceous earth starting material may be diatomaceous earth in its crude form or after subjecting the material to one or more processing steps.

As stated earlier, natural diatomaceous earth is, in general, a sedimentary biogenic silica deposit comprising the fossilized skeletons of diatoms, one-celled algae-like plants that accumulate in marine or fresh water environments. Honeycomb silica structures generally give diatomaceous earth useful characteristics such as absorptive capacity and surface area, chemical stability, and low-bulk density. In one embodiment, natural diatomaceous earth comprises about 90% $SiO_2$ mixed with other substances. In another embodiment, crude diatomaceous earth comprises about 90% $SiO_2$, plus various metal oxides, such as but not limited to Al, Fe, Ca, and Mg oxides.

The diatomaceous earth starting material may have any of various appropriate forms now known to the skilled artisan or hereafter discovered. In one embodiment, the at least one natural diatomaceous earth is unprocessed (e.g., not subjected to chemical and/or physical modification processes). Without wishing to be bound by theory, the impurities in natural diatomaceous earth, such as clays and organic matters, may, in some embodiments, provide higher cation exchange capacity. In another embodiment, the at least one natural diatomaceous earth undergoes minimal processing following mining or extraction. In a further embodiment, the at least one natural diatomaceous earth is subjected to at least one physical modification process. The skilled artisan will readily know physical modification processes appropriate for use in the present inventions, which may be now known or hereafter discovered; appropriate physical modification processes include, but are not limited to, milling, drying, and air classifying. In yet another embodiment, the at least one natural diatomaceous earth is subjected to at least one chemical modification process. The skilled artisan will readily know chemical modification processes appropriate for use in the present inventions, which may be now known or hereafter discovered; appropriate chemical modification processes include but are not limited to, silanization. Silanization may be used to render the surfaces of the at least one natural diatomaceous earth either more hydrophobic or hydrophilic using the methods appropriate for silicate minerals. See U.S. Pat. No. 3,915,735 and U.S. Pat. No. 4,260, 498, the contents of which are incorporated herein by reference in their entireties. In one embodiment useful for increasing hydrophobicity, the at least one natural diatomaceous earth is placed in a plastic vessel, and a small quantity of dimethyldichlorosilane ($SiCl_2(CH_3)_2$) or hexadimethylsilazane (($CH_3)_3Si$—NH—$Si(CH_3)_3$) is added to the vessel. The reaction is allowed to take place at the at least one natural diatomaceous earth surface in the vapor phase over a 24-hour period. In one embodiment, hydrophobically enhanced diatomaceous earth according to the present inventions may have application in chromatographic compositions. In another embodiment, hydrophobically enhanced diatomaceous earth according to the present inventions, when used in conjunction with at least one additional hydrophobic material, may provide improved mechanical performance in applications involving hydrocarbons and/or oils. In a further embodiment, hydrophobically enhanced diatomaceous earth according to the present inventions, when used in conjunction with at least one additional hydrophobic material, may provide reinforcement in applications involving plastics and/or other polymers.

The diatomaceous earth starting material may be characterized by a d10 value, defined as the size at which 10 percent of the diatomite particle volume is accounted for by particles having a diameter less than or equal to the stated value. In one embodiment, the diatomaceous earth starting material has d10 less than about 6 microns. In another embodiment, the d10 is less than about 5 microns. In a further embodiment, the d10 is from about 3 to about 5 microns.

The diatomaceous earth starting material may be characterized by a d50 value, defined as the size at which 50 percent of the particle volume is accounted for by particles having a diameter less than or equal to the stated value. In one embodiment, at diatomaceous earth starting material has a d50 less than about 20 microns. In another embodiment, the d50 is less than about 15 microns. In a further embodiment, the d50 is less than about 14 microns. In yet another embodiment, the d50 is from about 10 to about 20 microns.

The diatomaceous earth starting material may be characterized by a d90 value, defined as the size at which 90 percent of the particle volume is accounted for by particles having a diameter less than or equal to the stated value. In one embodiment, the diatomaceous earth starting material has a d90 less than about 50 microns. In another embodiment, the d90 is less than about 45 microns. In a further embodiment, the d90 is from about 35 to about 50 microns.

Particle size measurements, such as those for d10, d50, and d90 determinations, may be carried out by any means now or hereafter known to those of ordinary skill in the art. For example, particle size measurements made be carried out using standard techniques on a Microtrac X100 Particle Size Analyzer.

In one embodiment, the at least one natural diatomaceous earth is a commercially available diatomaceous earth product. In another embodiment, the at least one natural diatomaceous earth is a material available under the Celite® trade name available from World Minerals, Inc.

The Suspension

The suspension which is to be spray-dried is typically an aqueous suspension comprising a liquid medium and a solids portion. The liquid medium is typically water.

The suspension further includes a binder. The binder may be inorganic or organic and may comprise a solid component, as for example a latex type binder. Further details of the binder are discussed below.

The solids portion comprises the particulate diatomaceous earth component together with one or more optional additional inorganic components and one or more optional organic solid components.

The inorganic solids content of the suspension is dependent on the spray-drying method to be used, which is discussed in more detail below, and the size of spray-dried granules desired. Typically, however, in order to have a viscosity suitable for spray-drying, the suspension should have an inorganic solids content of at least 5%, for example at least 10%, for example at least 15% by weight, based on the weight of the suspension, and may have an inorganic solids content of up to 30%, or 25% or 20%, based on the weight of the suspension. Typically, the solids content will be in the range of 15-25% by weight, based on the weight of the suspension.

The optional inorganic component may comprise one or more particulate inorganic mineral in addition to the diatomaceous earth; and/or one or more suitable fluxing agent. These components are discussed further below.

The optional organic solids component may be the solids component of an organic binder.

Spray-Drying

The suspension is spray-dried in a manner which is known per se. The suspension is fed to the inlet of a spray-dryer and spray-dried material is discharged from the atomiser.

Spray-drying may also be carried out using a nozzle atomiser or fountain spray-drying technique, in which the slurry is sprayed upwards from the cone of the drying chamber. This allows drying to take place during the complete flight-arc of the droplets before they return to the bottom of the dryer, providing a coarser, more free-flowing powder.

Another type of spray-dryer which may be used in the invention is one which employs a "rotating wheel" or "spinning disc" atomiser.

One example of a suitable spray-drying apparatus is a Niro Minor spray dryer unit. This machine has a drying chamber 800 mm in diameter, 600 mm cylindrical height being conical based and is fitted with an air driven disc type atomiser. The atomiser may be run at a speed of 30,000 rpm. Drying may be carried out using an inlet-air temperature of 300° C. Slurry is fed via a peristaltic pump to the atomiser at a rate selected to maintain the required outlet temperature (typically 110 to 120° C.).

The spray-dried product comprises substantially spherical granules having an outer wall or shell which surround a hollow core. The outer wall comprises the particles of diatomaceous earth held together by non-covalent forces and the binder. The outer wall is porous as a result of the presence of the diatomaceous earth particles making up a substantial portion of the wall.

The spray-dried granules typically have a have a d50 in the range of from 10-250 μm, for example in the range of from 20-100 μm. The spray-drying process may yield uniform, or substantially uniform, spray-dried granules, in which case the diameter of the granules will lie in the aforesaid range. The steepness of the particle size distribution curve, as characterized by the d90/d10 ratio, is typically at least 5, preferably at least 8. In some embodiments, the spray-dried granulate may be essentially mono-disperse.

The inorganic solids content of the suspension is dependent on the spray-drying method to be used, which is discussed in more detail below, and the size of spray-dried granules desired. Typically, however, the suspension will have an inorganic solids content of the order of 5 to 30 wt %, for example 15 to 25 wt %.

The Binder

A binder may be included in the suspension to facilitate the formation of spray-dried granules.

In an embodiment, the binder may be a temporary binder. By "temporary binder" is meant a binder which is not intended to remain in the product but acts to bind particles of the diatomaceous earth together and support the spray-dried body after initial formation, which can then be subjected to one or more further treatment steps, including steps intended to impart structural rigidity to the spray-dried bodies, such as a heat treatment. Such temporary binders may thus be thermally fugitive, that is to say are removed from the spray-dried bodies on the application of sufficient heat which may vaporize or burn the binder material. Examples of suitable temporary binders are starches, carbohydrates, sugars, poly-vinyl acetates (PVA), poly-vinyl alcohols, latex, gelatines, waxes, celluloses, dextrines, thermo-plastic resins, thermo-setting resins, chlorinated hydrocarbons, gums, flours, caseins, alginates, proteins, bitumens, acrylics, epoxy resins, and urea. In embodiments of the invention, the temporary binder may be a poly vinyl alcohol binder or a latex binder.

The amount of temporary binder in the suspension may be in the range of up to 10 wt % on a solids basis, for example 2-10 wt %.

Where the binder is a temporary binder, the spray-dried granulate may be subjected to a heat treatment, or calcination, step in order to impart structural rigidity to the spray-dried bodies. In the heat treatment step, the temporary binder is removed, or substantially removed, from the spray-dried bodies.

In another embodiment, the binder may be a permanent binder. By "permanent binder" is meant a binder which is intended to remain in the product and provide structural strength to the spray-dried bodies without the need for a high temperature calcination step. Examples of permanent binders are cross-linked alginates, thermosetting resins, thermoplastic resins and styrene-butadiene polymers. The specific permanent binder to be used may be selected to ensure that the binder provides structural support to the aggregate without being significantly soluble in the liquid to be filtered. For example a binder which is insoluble in water would be suitable for use in a filter medium which is to be used in beer filtration.

The permanent binder may also, for example, be cross-linkable. In case such cross-linkable binders are used, a further chemical or low temperature heat treatment (for example less than 200° C.) may be required after the spray-dried bodies are formed in order to effect cross-linking. An example of a suitable cross-linkable binder is a copolymer of a vinyl acetate and an acrylic ester, such as Vinnapas AN214 from Wacker Chemie. It is to be appreciated that permanent binders used in the present invention may be thermally fugitive, if organic in nature. However, a distinction between a temporary binder and a permanent binder which is thermally fugitive is that a permanent binder is capable of fixing the aggregated structure produced during the spray-drying step, without the need for a calcination treatment.

Other permanent binders which are not thermally fugitive may be used. Such binders are inorganic-based. Examples include cements, pozzolanic materials, silicates, waterglass, gypsums, bentonites, and borates. Also included are aluminate binders, including alkali metal aluminate binders such as sodium aluminate, potassium aluminate or lithium aluminate, and alkaline earth metal aluminate binders, such as calcium aluminate and magnesium aluminate.

An advantage of using a permanent binder is that a calcination step can be avoided. In this respect, although calcination of the spray-dried material is an embodiment of the invention, such high temperature treatment may result in the loss of some of the very fine structures within the diatomaceous earth particles by melting, thus potentially reducing the filtration capability.

Heat Treatment/Calcination

The heat treatment, also referred to herein as a calcination treatment may be carried out at a suitable temperature to cause diatomaceous earth particles in the wall of the spray-dried bodies to be sintered together and thus result in a body which is resistant to crushing. The maximum calcination temperature may be for example at least 500° C., or at least 600° C., or at least 700° C., or at least 800° C., or at least 900° C. In order to avoid destroying the fine structure of the spray-dried bodies and incurring additional cost, the maximum calcination temperature is typically less than 1200° C., for example less than 1100° C. or less than 1000° C.

The duration of calcination can be determined empirically depending on the desired outcome. However, typically calcination may be carried out such that the duration at peak temperature is less than four hours, or less than three hours, or less than two hours, or less than one hour.

In an embodiment, calcination may be carried out by "flash" calcination, in which the calcination is conducted very rapidly.

Calcination may be carried out in a batch process, or in a continuous process. A suitable continuous process may use a rotary tube furnace, in which the uncalcined feed material is continuously passed through a heated zone maintained at the appropriate temperature.

In embodiments, the calcination may be carried out by increasing the calcination temperature at a rate of, for example, between 1 and 50° C. per minute, for example 1 to 10° C. per minute, up to the final, maximum temperature and then cooled at a rate of, for example, 1 to 50° C. per minute, for example 5 to 20° C. per minute, to room temperature.

The calcined, spray-dried granulate has substantially the same particle size distribution as the uncalcined starting material.

Optionally, prior to the heat treatment step, the granular diatomaceous earth product may be formed into shaped bodies by, for example, compressing in a press. If necessary a further amount of binder can be added at this stage, for example in an amount of at least 5 wt %. The amount of additional binder added is typically less than 20 wt %, for example less than 10 wt %. The compressed bodies are then subjected to the calcination step to obtain shaped, calcined bodies.

Further Inorganic Mineral

It is within the scope of the present invention to include in the suspension a small amount of an additional inorganic mineral component, for example 20% or less, based on the total weight of the inorganic solids in the suspension, for example 10% or less or 5% or less, based on the total weight of the inorganic solids present in the suspension. This will result in spray-dried granules including the additional inorganic mineral component in the outer wall thereof. This may be used to adjust the properties of the spray-dried granules, for example strength and/or permeability. Examples of additional inorganic mineral components are natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, and clay. Examples of clay minerals are halloysite, kaolinite and bentonite.

Fluxing Agent

A fluxing agent is an optional additional component of the suspension.

A fluxing agent may be necessary where the spray-dried granules, or a shaped body formed from the spray-dried granules is to be calcined (so-called "flux-calcining"). The presence of at least one fluxing agent during calcination may reduce the temperature at which diatomaceous earth particles in the wall of the spray-dried bodies are caused to be sintered together.

Suitable agents as the fluxing agent are any now known to those skilled in the art or which may hereafter be discovered. In one embodiment, the fluxing agent is sodium carbonate (soda ash, $Na_2CO_3$). In another embodiment, the fluxing agent is sodium hydroxide (NaOH). In a further embodiment, the at least one fluxing agent is sodium chloride (NaCl). In yet another embodiment, the at least one fluxing agent is potassium carbonate ($K_2CO_3$). In yet a further embodiment, the at least one fluxing agent is sodium borate ($Na_2B_4O_7$).

In one embodiment, the fluxing agent is at least one salt of at least one alkali metal in Group IA. In another embodiment, the fluxing agent is at least one salt of at least one alkali metal. In a further embodiment, the at least one alkali metal is sodium. In yet another embodiment, the at least one alkali metal is chosen from alkali metals having a larger atomic radius than that of sodium. In yet a further embodiment, the at least one alkali metal is potassium. In still another embodiment, the at least one alkali metal is rubidium.

The at least one fluxing agent is added to the suspension before spray-drying; as a result, the fluxing agent is located within the wall of the spray-dried granules at locations where it is readily able to provide its fluxing function.

The fluxing agent may be present in the suspension in an amount of less than about 8% based on the total weight of inorganic solids in the suspension, or in an amount of less than about 7%, or an amount of less than about 6%, or in amount of less than about 5%, or in amount of less than about 4%, or in amount of less than about 3%, or in amount less than about 2%. In another embodiment, the suspension contains from about 0.5% to about 10% fluxing agent, based on the total weight of inorganic solids in the suspension.

In some embodiments where the spray-dried granules or shaped body formed from the spray-dried granules are flux-calcined, the at least one fluxing agent may undergo a chemical decomposition reaction. In one embodiment of such a chemical decomposition, at least one fluxing agent containing sodium bonds with diatom silica present in the at least one feed material to form sodium silicate, expelling carbon dioxide gas in the process. In another embodiment, at least one fluxing agent containing at least one alkaline metal bonds with diatom silica present in the at least one feed material to form at least one alkaline metal silicate.

Forming Shaped Bodies

As discussed above, the granular spray-dried diatomaceous earth product may be formed into shaped bodies prior to calcining. Forming into an integral, shaped body may be accomplished using a press or die in a manner which is known per se. The pressure exerted in the press may be from 0.5 MPa to 20 MPa, preferably from 1 MPa to 10 MPa. If necessary, a further amount of a suitable binder can be added at this stage to ensure that the compacted mass forms a stable "green", i.e. unfired, pre-form. The size and shape of the shaped bodies is dependent on the intended use. By way of example, however, the shaped bodies may be formed as discs which have a diameter in the range of from 5 to 100 mm and a thickness of 1-20 mm. In an embodiment, the shaped body may be used as a filter element in a cartridge filter, in which case the filter body should be shaped and sized to be received in the appropriate space in the cartridge. A typical cartridge may have a diameter of about 65 mm and a length of about 255 mm.

The green, compressed bodies are then subjected to a calcination step to obtain shaped, calcined bodies. The calcination conditions may be the same as specified above for the granular spray-dried product. After calcination, adjacent granules become sintered together to provide the body with the necessary structural strength to function as, for example, a filter medium.

Granular Spray-Dried Product

The granular spray-dried diatomaceous earth product obtainable by the method of the present invention comprises substantially spherical granules each having a shell comprising diatomaceous earth surrounding a hollow core, and is typically obtained in the form of a free-flowing granulate. After calcination, the product has substantially the same form. Any loose agglomeration of the spray-dried bodies can readily be broken down to form the free-flowing mass.

In an embodiment, the specific pore volume of a packed body of the granular material is at least 3 cc/g, or at least 4 cc/g or at least 5 cc/g. Typically, products of the invention have little, if any, pore volume in pores smaller than 0.1 µm or larger than 100 µm. The majority of the pore volume, for example at least 70% of the pore volume may be in pores larger than 1 µm and smaller than 100 µm. At least 40% of the pore volume may be in pores larger than 10 µm and smaller than 100 µm. Pore volume may be measured by mercury porosimetry using the method described below. The average pore diameter of a packed body of the granular material may be of the order of 5-15 µm, for example about 10 µm. Typically, the average pore diameter of the granules (excluding intra-particle pores and the hollow void formed with the granules) is of the order of 1-3 µm, for example about 2 µm.

The diatomaceous earth products disclosed herein may have a low cristobalite content. In one embodiment, the cristobalite content is less than about 2% by weight. In another embodiment, the cristobalite content is less than about 1% by weight. In a further embodiment, the cristobalite content is less than about 0.5% by weight. In yet another embodiment, the cristobalite content is less than about 0.1% by weight.

Cristobalite content may be measured by any appropriate measurement technique now known to the skilled artisan or hereafter discovered, including the specific method described in WO 2010/042614. The diatomaceous earth products disclosed herein may comprise at least one soluble metal. As used herein, the term "soluble metal" refers to any metal that may be dissolved in at least one liquid. Soluble metals are known to those of skill in the art and include, but are not limited to, iron, aluminum, calcium, vanadium, chromium, copper, zinc, nickel, cadmium, and mercury. When a filter aid comprising diatomaceous earth is used to filter at least one liquid, at least one soluble metal may dissociate from the diatomaceous earth filter aid and enter the liquid. In many applications, such an increase in metal content of the liquid is undesirable and/or unacceptable. For example, when a filter aid comprising diatomaceous earth is used to filter beer, a high level or iron dissolved in the beer from the filter aid may adversely affect sensory or other properties, including but not limited to taste and shelf-life.

Any appropriate protocol or test for measuring levels of at least one soluble metal in diatomaceous earth products may be used, including those now known to the skilled artisan or hereafter discovered. For example, the brewing industry has developed at least one protocol to measure the BSI of diatomaceous earth filter aids. BSI, or beer soluble iron, refers to the iron content, which may be measured in parts per million, of a filter aid comprising diatomaceous earth that dissociates in the presence of a liquid, such as beer. The European Beverage Convention (EBC) method contacts liquid potassium hydrogen phthalate with the filter aid and then analyzes the liquid for iron content. More specifically, the EBC method uses, for example, a 10 g/L solution of potassium hydrogen phthalate (KHP, $KHC_8H_4O_4$) as the extractant along with a given quantity of filter aid material, with a total contact time of two hours. Extracts are then analyzed for iron concentration by the FERROZINE method.

In one embodiment, the beer soluble iron of a diatomaceous earth product disclosed herein ranges from about 100 ppm to about 150 ppm, when measured using an EBC method. In another embodiment, the beer soluble iron ranges from about 100 ppm to about 120 ppm. In a further embodiment, the beer soluble iron ranges from about 110 ppm to about 120 ppm. In yet another embodiment, the beer soluble iron is less than about 150 ppm.

BSA, or beer soluble aluminum, refers to the aluminum content, which may be measured in parts per million, of a filter aid comprising diatomaceous earth that dissociates in the presence of a liquid, such as beer. BSA may be measured, for example, by tests similar to the EBC methods described above that have been appropriately modified to detect aluminum (such as through the use of spectrometry). In one embodiment, the beer soluble aluminum of a diatomaceous earth product disclosed herein range from about 350 ppm to about 850 ppm. In another embodiment, the beer soluble aluminum ranges from about 400 ppm to about 700 ppm. In a further embodiment, the beer soluble aluminum ranges from about 450 ppm to about 600 ppm. In yet another embodiment, the beer soluble aluminum is less than about 850 ppm.

BSC, or beer soluble calcium, refers to the calcium content, which may be measured in parts per million, of a filter aid comprising diatomaceous earth that dissociates in the presence of a liquid, such as beer. BSC may be measured, for example, by tests similar to the EBC methods described above that have been appropriately modified to detect calcium (such as through the use of spectrometry). In one embodiment, the beer soluble calcium of a diatomaceous earth product disclosed herein ranges from about 450 ppm to about 1200 ppm. In another embodiment, the beer soluble calcium ranges from about 450 ppm to about 850 ppm. In a further embodiment, the beer soluble calcium ranges from about 650 ppm to about 850 ppm. In yet another embodiment, the beer soluble calcium ranges from about 450 ppm to about 650 ppm. In yet a further embodiment, the beer soluble calcium is less than about 1200 ppm.

The diatomaceous earth products disclosed herein may have a permeability suitable for use in a filter aid composition. Permeability may be measured by any appropriate measurement technique now known to the skilled artisan or hereafter discovered. Permeability is generally measured in darcy units or darcy, as determined by the permeability of a porous bed 1 cm high and with a 1 $cm^2$ section through which flows a fluid with a viscosity of 1 mPa·s with a flow rate of 1 $cm^3$/sec under an applied pressure differential of 1 atmosphere. The principles for measuring permeability have been previously derived for porous media from Darcy's law (see, for example, J. Bear, "The Equation of Motion of a Homogeneous Fluid: Derivations of Darcy's Law," in Dynamics of Fluids in Porous Media 161-177 (2nd ed. 1988)). An array of devices and methods are in existence that may correlate with permeability. In one exemplary method useful for measuring permeability, a specially constructed device is designed to form a filter cake on a septum from a suspension of filtration media in water; the time required for a specified volume of water to flow through a measured thickness of filter cake of known cross-sectional area is measured.

Thus, in an embodiment, the product described herein may have a permeability of at least 1.0 Da, preferably at least 3.0 Da.

The spray-dried granular product of the invention is useful as a filtration aid. The filtration properties of the product may be determined using a Walton filter apparatus with Ovaltine® as the filtration challenge. The Walton filtration test method is set forth in Appendix A following the examples.

As an alternative to the use of a Walton Ovaltine® challenge, a Walton cloudy apple juice challenge may be employed. The brand of Apple Juice used was "Vitafit Cloudy Apple Juice", product of Lidl Stiftung & Co which has an initial turbidity of 40.31 NTU.

Uses of the Diatomaceous Earth Products

The diatomaceous earth products disclosed herein may be used in any of a variety of processes, applications, and materials. In one embodiment, the diatomaceous earth products are used in at least one process, application, or material in which such a product with a high BET surface area is desirable.

In one embodiment, the diatomaceous earth product may be comprised in a filter aid material or composition. A filter aid composition comprising at least one diatomaceous earth product may optionally comprise at least one additional filter aid medium. Examples of suitable at least one additional filter aid media include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, and clay.

The at least one additional filter medium may be present in any appropriate amount. In one embodiment, the at least one additional filter medium is present from about 0.01 to about 100 parts of at least one additional filter medium per part of treated diatomaceous earth material. In another embodiment, the at least one additional filter medium is present from about 0.1 to about 10 parts. In a further embodiment, the at least one additional filter medium is present from about 0.5 to 5 parts.

The filter aid composition may be formed into sheets, pads, cartridges, or other monolithic or aggregate media capable of being used as supports or substrates in a filter process. Considerations in the manufacture of filter aid compositions may include a variety of parameters, including but not limited to, total soluble metal content of the composition, median soluble metal content of the composition, particle size distribution, pore size, cost, and availability.

A filter aid composition comprising a diatomaceous earth product of the invention may be used in a variety of processes and compositions. In an embodiment, the filter aid composition is applied to a filter septum to protect it and/or to improve clarity of the liquid to be filtered in a filtration process. In another embodiment, the filter aid composition is added directly to a beverage to be filtered to increase flow rate and/or extend the filtration cycle. In a further embodiment, the filter aid composition is used as pre-coating, in body feeding, or a combination of both pre-coating and body feeding, in a filtration process.

The diatomaceous earth product of the invention may also be used in a variety of filtering methods. In one embodiment, the filtering method comprises pre-coating at least one filter element with at least one diatomaceous earth filter aid of the invention, and contacting at least one liquid to be filtered with the at least one coated filter element. In such an embodiment, the contacting may comprise passing the liquid through the filter element. In another embodiment, the filtering method comprises suspending the diatomaceous earth filter aid in at least one liquid containing particles to be removed from the liquid, and then separating the filter aid from the filtered liquid.

Filter aids comprising a diatomaceous earth product of the present invention may also be employed to filter various types of liquids. The skilled person is readily aware of liquids that may be desirably filtered with a process comprising the filter aids comprising at least one diatomaceous earth product disclosed herein. In one embodiment, the liquid is a beverage. Exemplary beverages include, but are not limited to, vegetable-based juices, fruit juices, distilled spirits, and malt-based liquids. Exemplary malt-based liquids include, but are not limited to, beer and wine. In another embodiment, the liquid is one that tends to form haze upon chilling. In a further embodiment, the liquid is a beverage that tends to form haze upon chilling. In yet another embodiment, the liquid is a beer. In yet a further embodiment, the liquid is an oil. In still another embodiment, the liquid is an edible oil. In still a further embodiment, the liquid is a fuel oil. In another embodiment, the liquid is water, including but not limited to waste water. In a further embodiment, the liquid is blood. In yet another embodiment, the liquid is a sake. In yet a further embodiment, the liquid is a sweetener, such as for example corn syrup or molasses.

The diatomaceous earth products disclosed herein may also be used in applications other than filtration. In one embodiment, the diatomaceous earth products are used as composites in filler applications, such as for example fillers in constructions or building materials. In another embodiment, the diatomaceous earth products are used to alter the appearance and/or properties of paints, enamels, lacquers, or related coatings and finishes. In a further embodiment, the diatomaceous earth products are used in paper formulations and/or paper processing applications. In yet another embodiment, the diatomaceous earth products are used to provide anti-block and/or reinforcing properties to polymers. In yet a further embodiment, the diatomaceous earth products are used as or in abrasives. In still another embodiment, the diatomaceous earth products are used for buffing or in buffing compositions. In still a further embodiment, the diatomaceous earth products are used for polishing or in polishing compositions. In another embodiment, the diatomaceous earth products are used in the processing and/or preparation of catalysts. In a further embodiment, the diatomaceous earth products are used as chromatographic supports or other support media. In yet another embodiment, the diatomaceous earth products are blended, mixed, or otherwise combined with other ingredients to make monolithic or aggregate media useful in a variety of applications, including but not limited to supports (for example, for microbe immobilization) and substrates (for example, for enzyme immobilization).

All references referred to herein are incorporated herein by reference in their entirety.

EXAMPLES

The invention will now be illustrated by reference to the following, non-limiting examples.

Examples 1 to 6

A series of six aqueous slurries of diatomaceous earth were prepared, each having a volume of approximately 2 liters and a solids content of approximately 20 wt %. The diatomaceous earth used was CelTix™, a particulate diatomaceous earth product available from World Minerals, Inc. The slurries were prepared using a low shear stirrer. Two temporary binder chemical types were utilised: Mowail 4-88, a polyvinyl alcohol "PV-OH" having a molecular weight of approximately 31,000); and Dow 920, a carboxylated latex binder based on a styrene butadiene polymer. The details of the slurries are given in Table 1.

TABLE 1

| | Solids (wt %) | Binder type | Binder level (wt %) |
|---|---|---|---|
| Example 1 | 17.3 | None | 0 |
| Example 2 | 20.4 | PV-OH | 2 |
| Example 3 | 20.0 | PV-OH | 3 |
| Example 4 | 18.8 | PV-OH | 5 |
| Example 5 | 20.0 | Latex | 5 |
| Example 6 | 19.2 | Latex | 5 |

Each slurry was spray-dried on a Niro Minor spray dryer unit to obtain a granulate in the form of a free flowing powder having a relatively robust structure. This machine has a drying chamber 800 mm in diameter, a cylindrical height of 600 mm, and is conical based and fitted with an air driven disc type atomiser. The atomiser was run at a speed of 30,000 rpm. Drying was carried out using an inlet-air temperature of 300° C. Slurry was fed via a peristaltic pump to the atomiser at a rate selected to maintain the required outlet temperature (in the range 110 to 120° C.).

The particle size distributions of the CelTix™ feed material and each of the spray-dried products was determined by laser diffraction (CILAS). Measurements were made using the "dry powder mode" in which samples are aspirated into the instrument in an air-stream designed to disperse any loose agglomerates. A dispersion pressure of 1000 mb was used. This measurement mode was selected because suspension in water could cause the spray-dried product to break-down and disperse. The particle size determinations are set forth in Table 2 below.

TABLE 2

| | Feed | Ex. 1 | Ex. 2 | Ex. 3 | Ex. 4 | Ex. 6 |
|---|---|---|---|---|---|---|
| d10 (μm) | 1.3 | 1.8 | 4.7 | 6.1 | 9.4 | 7.0 |
| d50 (μm) | 9.9 | 11.9 | 20.4 | 25.9 | 36.1 | 32.8 |
| d90 (μm) | 20 | 24.6 | 58.6 | 60.2 | 67.6 | 68.5 |

The results indicate that up to a threefold increase in particle size is achieved by spray-drying the diatomaceous earth feed material with binder depending on the amount of binder added.

A sample of the spray-dried granulate of Example 4 was examined by optical microscopy, see FIG. 1. The image shows that the material is made up of spherical aggregates.

The spray-dried granules of Examples 4 and 6 containing 5 wt % binder were calcined in a laboratory muffle furnace, using a firing schedule of 5° C./minute to a plateau of 1100° C. with a 1-hour dwell before cooling to room temperature at 10° C./minute. The calcined products were characterized in terms of particle size by the same laser diffraction method specified above, and compared with the particles sizes of the uncalcined spray-dried granules. The results obtained are set forth in Table 3 below.

TABLE 3

| | Ex. 4 (uncalcined) | Ex. 4 (calcined) | Ex. 6 (uncalcined) | Ex. 6 (calcined) |
|---|---|---|---|---|
| d10 (μm) | 9.4 | 13.0 | 7.0 | 8.3 |
| d50 (μm) | 36.1 | 38.5 | 32.8 | 38.8 |
| d90 (μm) | 67.6 | 73.0 | 68.5 | 70.2 |

The data shows a slight further coarsening of the granulate particle size with calcination.

Figure 2A:
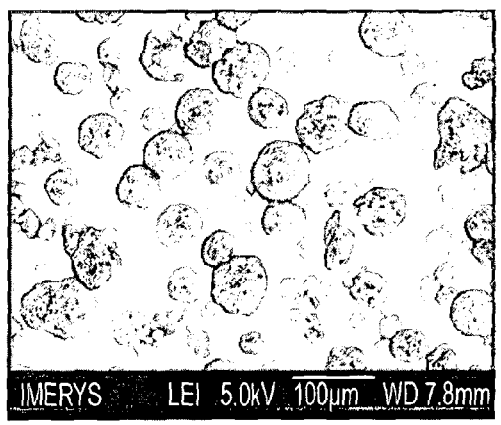
FIGS. 2a and 2b are electromicrographs of the calcined and spray-dried diatomaceous earth product of Example 5.
Figure 2B:
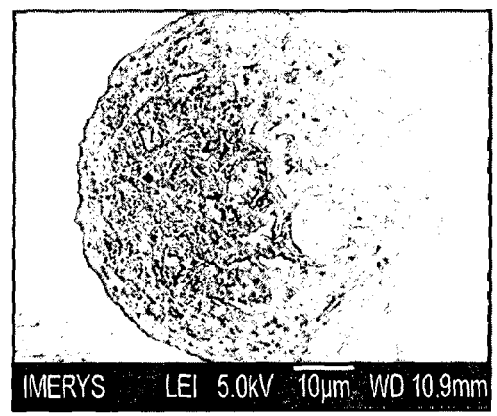
Figure 3C:
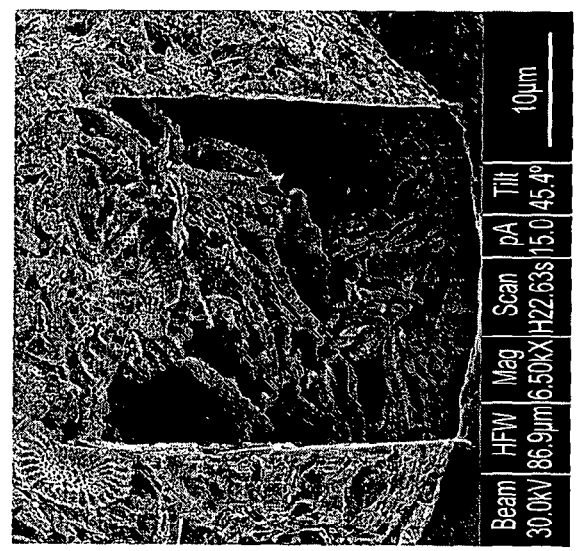
FIGS. 3a, 3b and 3c are electromicrographs showing the internal structure of the calcined, spray-dried diatomaceous earth product of Example 5.
Figure 3B:
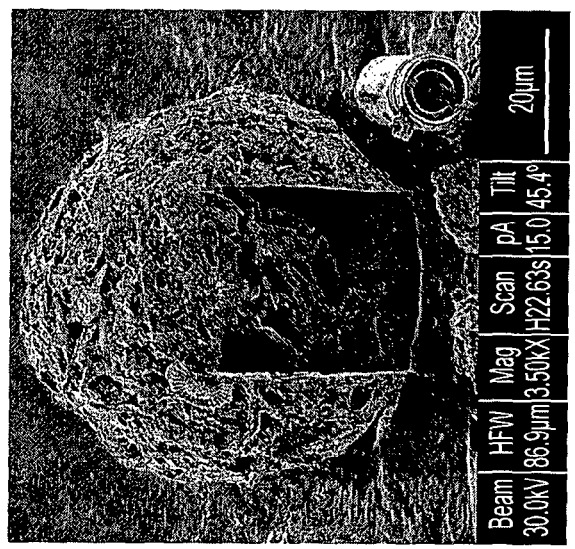
Figure 3A:
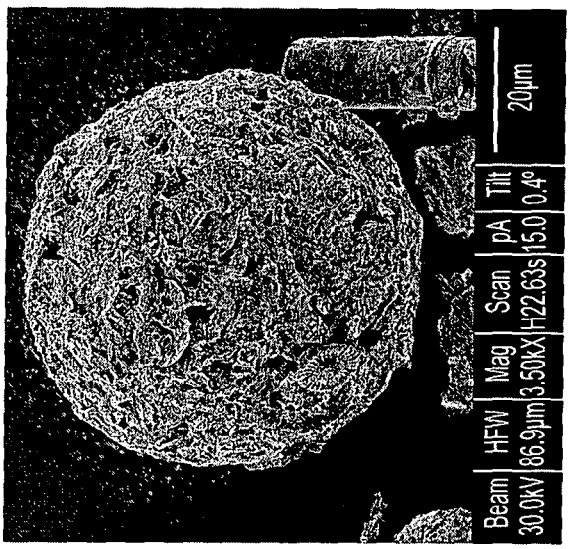

Electromicrographs were prepared of the calcined product of Example 5 and are shown in FIGS. 2a and 2b. Details of the internal structure of the calcined granulate of Example 5 was obtained by carrying out a focused ion beam section followed by collection of SEM images (see FIG. 3a-c), from which it can be seen that the interior of the particles has an open structure.

Figure 4:
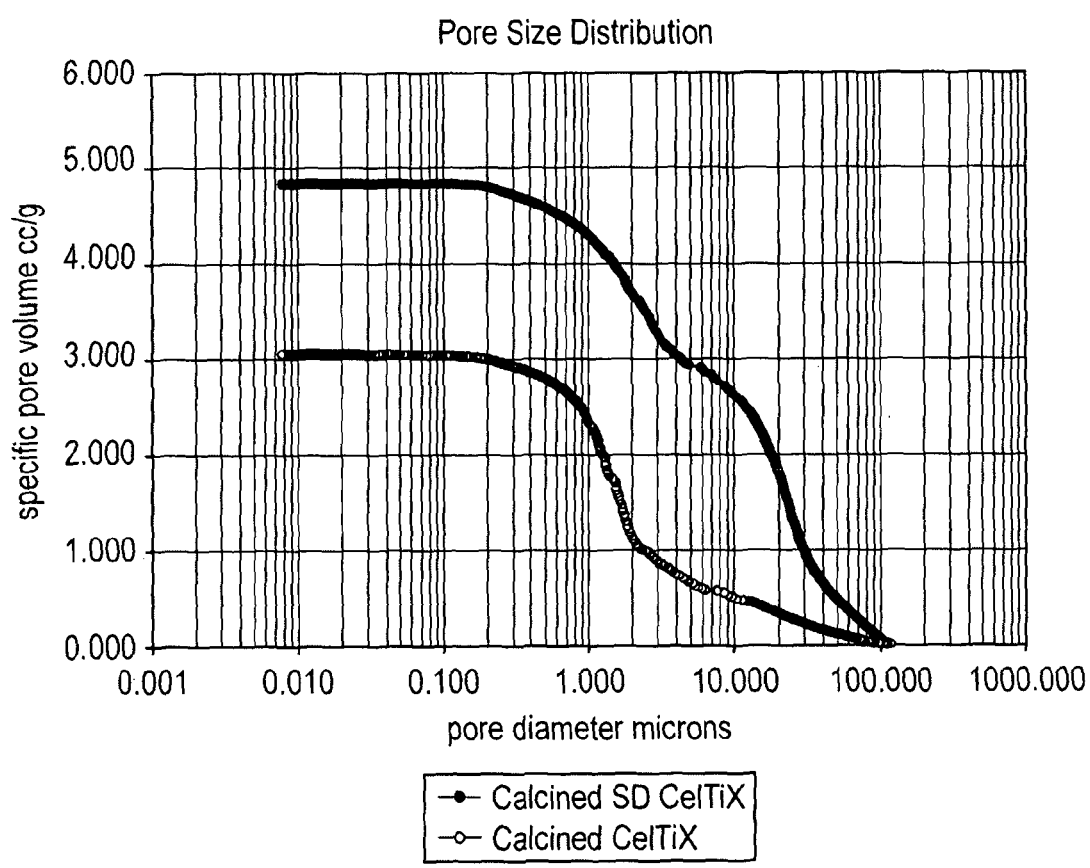
FIG. 4 is a graph of the pore size distribution of the calcined, spray-dried product of Example 4 compared with that of the calcined diatomaceous earth feed material.

Mercury porosimetery was used to quantify the porous nature of a packed body of the calcined, spray-dried product of Example 4, and to compare this with the porous nature of a packed body of the calcined diatomaceous earth feed material (CelTiX™). Powder samples were analysed in a CE Instruments Model "Pascal 240" mercury porosimeter. The method involves evacuation of the sample placed in a dilatometer, which is subsequently filled with mercury. Pressure is applied to the filled dilatometer and the mercury intrudes first into the intra-particle pores between granules and the hollow voids of the particles, and then into the pores of the granules within the sample under test. The volume of mercury intruded is determined by a precision capacitive electrode and the pore diameter calculated from the applied pressure according to the Washburn equation. The contact angle for porosimetery was 140°, and the pressure typically 0.012 MPa to 200 MPa. The results obtained are shown in FIG. 4. From FIG. 4 it can be determined that the average pore diameter of the packed bulk of the calcined, spray-dried material is about 10 μm, whereas the equivalent measure for the calcined diatomaceous earth feed material was about 1-2 μm. Excluding the intra-particle pores and the hollow voids formed within the granules, the average pore diameter of both the spray-dried material and the calcined diatomaceous earth feed material was of the order of 1-2 μm.

A significant increase in the average pore size and the total pore volume is noted for the calcined spray-dried granulate compared to the control (calcined CelTiX™ powder).

Surface area (BET, according to ISO9277) and permeability of the calcined products of Examples 4 and 6 were determined, and the results are set forth in Table 4 below.

TABLE 4

| | Example 4 | Example 6 |
|---|---|---|
| Surface area (BET) | 8.6 | 8.3 |
| Permeability (Da) | 1.28 | 0.85 |

The filtration performance of the calcined products of Examples 4 and 6 was evaluated using the Walton "Ovaltine®" test. The filtration tests were run at 120 mls/min using 6 liters of water, 30 gms Ovaltine® and 12 gms of filter aid. The control product (HYFLO® K, World Minerals Inc.), used as both pre-coat and body feed, was selected on the basis of having similar permeability to the experimental samples. No pre-coat was used in the case of the calcined spray-dried granulates. Results are given in Table 5.

TABLE 5

| | Control | | | Example 4 | | | Example 6 | |
|---|---|---|---|---|---|---|---|---|
| Time (min) | Pressure (bar) | Clarity (NTU) | Time (min) | Pressure (bar) | Clarity (NTU) | Time (min) | Pressure (bar) | Clarity (NTU) |
| 0 | 0 | | 0 | 0 | | 0 | 0 | |
| 5 | 0.37 | | 5 | 0.49 | | 5 | 0.5 | |
| 10 | 0.80 | | 10 | 1.00 | | 10 | 0.89 | |
| 15 | 1.10 | 28.93 | 15 | 1.19 | 2.86 | 15 | 1.09 | 4.34 |
| 20 | 1.25 | | 20 | 1.22 | | 20 | 1.20 | |
| 25 | 1.30 | | 25 | 1.30 | | 25 | 1.22 | |
| 30 | 1.38 | 19.80 | 30 | 1.35 | 0.96 | 30 | 1.29 | 1.68 |
| 35 | 1.39 | | 35 | 1.36 | | 35 | 1.30 | |

The data show that superior clarity is obtained with the calcined spray dried granulates. Moreover this is achieved with similar pressure and without a pre-coat.

Example 7

A large scale experiment was conducted based on spray-drying a slurry of the same diatomaceous earth feed material as was used in Examples 1-6 (CelTiX™) with 5 wt % of a food contact grade polyvinyl alcohol (Mowiol 5-88) as binder at a solids content of approximately 20 wt %.

100 kg of the Mowiol 5-88 binder was made down at 10 wt % in batches consisting of 12 kg/120 liters. The make down process was carried out at 20° C. The make-down could be accelerated using a make down temperature of 40° C.

1000 kg of CelTiX™ with "as received" moisture content of 6.7 wt % was made down in a Charlestown blunger containing 3500 liters of water to which 500 liters of the Mowiol 5-88 solution had been added. The slurry appeared well dispersed and was pumped to a holding tank. A second batch was prepared in the same manner and the two combined in the holding tank and stirred overnight to allow foaming to break down yielding slurry with a smooth appearance. The solids content was measured and found to be 18.6 wt % with viscosity of 128 cPs. The slurry was passed through a coarse "trash screen" to remove any possible contamination and fed to the spray dryer holding tank. The spray dryer was operated at an inlet temperature of 350-375° C. with outlet temperature being in the range 110-120° C. A throughput of 125 kg/hr was achieved. A total of 1800 kg of material was produced (~86% yield). The product had a typical moisture content of 5 wt % with a d50 of 53 μm, as measured using the CILAS method described above.

Measurements of the particle size distribution of 13 samples from different stages of a run were made: the mean and standard deviation, as well as moisture content are set forth in Table 6 below.

TABLE 6

| | d10 μm | d50 μm | d90 μm | Moisture wt % |
|---|---|---|---|---|
| Mean | 19.9 | 51.9 | 88.3 | 4.2 |
| Std dev | 8.0 | 13.9 | 15.8 | 0.5 |

Figure 5A:
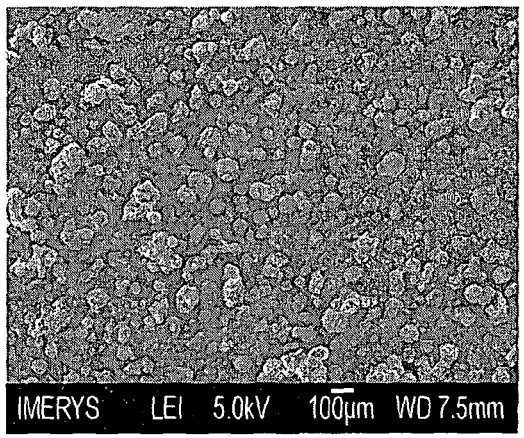
FIGS. 5a and 5b are SEM images of the spray-dried product of Example 7.
Figure 5B:
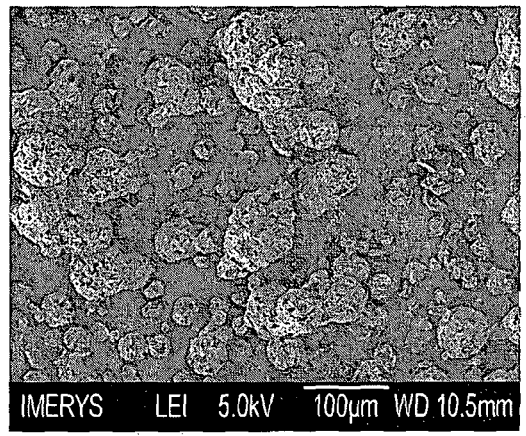

SEM images of the product were also collected, see FIGS. 5a and 5b. The particles appeared generally similar in terms of morphology to those prepared at laboratory scale although slightly coarser.

Example 8

The spray-dried material obtained in Example 7 was calcined in an APV indirectly fired gas rotary kiln. Initially the kiln was operated with a rotation rate of 4 rpm but this was found to be too fast so the remainder of the trial was conducted at 1.7 rpm.

Air flow through the work tube was reduced to a minimum to prevent the low density feed from being drawn into the bag filter of the spray-dryer.

The feed rate was determined to be 6 kg/hr. The product was collected at 900° C. but the bulk was produced at 1000° C. at a rate of 5 kg/hr. The yield was in line with expected mass loss due to moisture of feed and organic content.

A total of 90 kg of feed was processed, and a total of approximately 37 kg of product was collected The physical properties of the calcined products were determined, and the results are set forth in Table 7. Particle size measurements (d10, d50 and d90) were determined by CILAS laser diffraction. Surface area was measured by the BET method.

TABLE 7

| | d10 μm | d50 μm | d90 μm | Surface Area ($m^2g^{-1}$) |
|---|---|---|---|---|
| 900° C. | 7 | 38 | 75 | 18.8 |
| 1000° C. early sample | 13 | 48 | 84 | 13.9 |
| 1000° C. late sample | 16 | 49 | 85 | 6.5 |

A mineralogical determination was also made, and the results are set forth in Table 8.

TABLE 8

| | Quartz % | Cristo-balite % | Trydim-ite % | Amorphous |
|---|---|---|---|---|
| 900° C. | Trace | Trace | Trace | Remainder |
| 1000° C. early sample | 9 | 6 | Trace | Remainder |
| 1000° C. late sample | 6 | 10 | Trace | remainder |

The higher surface area and lower cristobalite content shown in the analysis of the "1000° C. early" sample suggests that the conditions had not stabilised within the kiln when the sample was collected.

Figure 6A:
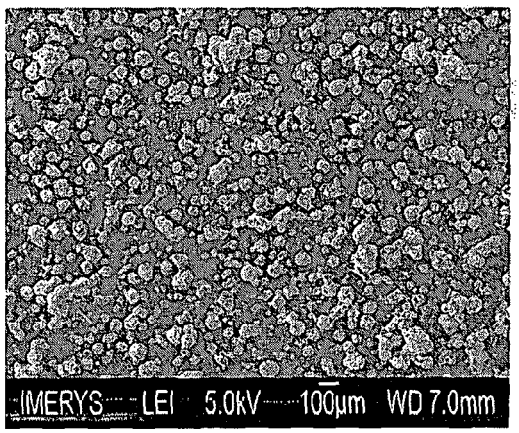
FIGS. 6a and 6b are SEM images of the calcined, spray-dried product of Example 8.
Figure 6B:
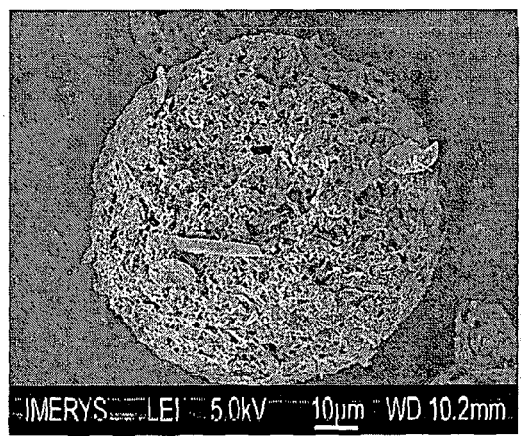

SEM images of the product calcined at 1000° C. were collected (FIGS. 6a and 6b).

Filtration performance was analysed by Darcy permeability and tests using a Walton filter apparatus with Ovaltine® as the filtration challenge. For selected samples a "cloudy" apple-juice challenge was employed.

In the Ovaltine® tests, a flow rate of 120 mls/min was maintained throughout the test. No pre-coat was used with these samples. For "cloudy apple juice", the flow rate was 120 mls/min using 5.85 liters water+150 mls apple juice (i.e. 2.5% juice) and 12 g of filter aid. As controls, commercial Celite® flux calcined diatomaceous earth products "C535" and "C545" were used, selected on the basis of permeability matching that of the experimental materials. The controls required the use of a "pre-coat" to prevent loss of filter aid through the screen—the pre-coat used was the same as the body feed in each case. The results of the "Ovaltine®" test are set forth in Table 9.

TABLE 9

| | | Pressure (bar) | | Clarity (NTU) | |
|---|---|---|---|---|---|
| SA $(m^2g^{-1})$ | Permeability Darcy | at 15 mins | at 30 mins | at 15 mins | at 30 mins |
| C535 0.94 | 2.81 | 1.25 | 1.40 | 35.62 | 20.07 |
| C545 0.66 | 4.28 | 1.93 | 1.98 | 18.85 | 12.76 |
| 900° C. 19.0 | 4.02 | 1.50 | 1.51 | 2.70 | 1.20 |
| 1000° C. 6.2 | 3.75 | 0.9 | 1.20 | 5.01 | 2.97 |
| 1000° C. 6.5 | 5.26 | 1.35 | 1.41 | 6.34 | 4.56 |
| 1000° C. 6.8 | 5.07 | 1.05 | 1.25 | 3.47 | 2.51 |

The three samples which were calcined at 1000° C. were different samples taken from the calcination trial at sequential times after a steady state had been reached. The first "1000° C." sample is the "1000° C. late" sample of Example 8.

The results of the "Cloudy Apple Juice" test are set forth in Table 10.

TABLE 10

| | | Pressure (bar) | | | Clarity (NTU) | | |
|---|---|---|---|---|---|---|---|
| SA $(m^2g^{-1})$ | Permeability Darcy | at 0 min | at 15 min | at 30 min | at 0 min | at 15 min | at 30 min |
| C545 — | 4.28 | 0.00 | 0.00 | 0.00 | 12.13 | 19.0 | 17.69 |
| 1000° C. 6.8 | 5.07 | 0.00 | 0.00 | 0.00 | 6.72 | 3.87 | 2.13 |

Results from the permeability measurements show that the calcined spray-dried materials of the invention have permeability within the same range as the commercial product controls C535 and C545. In the Walton filter tests, pressure rise was similar to the control C535.

The efficiency of the filtration performance of the experimental material determined by the clarity of the filtration increases inversely with calcination temperature. This is in line with normal diatomaceous earth products and reflects the loss of fine structure in the diatomaceous earth at higher calcination temperature. The clarity achieved is however, far superior to that for the controls. Such performance lies beyond the normal relationship between permeability and clarity which is normally only possible with a filter-aid having a significantly lower permeability than that showed by the experimental material.

The performance in the cloudy apple juice tests confirmed the remarkable filtration performance of the experimental material. An additional benefit is provided in that no pre-coat is required in the case of the experimental material as consequence of the relatively large particle size.

Example 9

An experiment was carried out to evaluate the use of a permanent binder to avoid the need for a calcination step.

Laboratory samples of spray-dried granulate were prepared from a slurry of the same diatomaceous earth feed material used in Examples 1-6 in water at 20 wt % solids to which 100 g of a permanent binder was added at a rate of 5 wt % on the mineral. The permanent binder used was Vinnapas AN214, which is a co-polymer of a vinyl acetate and an acrylic ester manufactured by Wacker. This polymer is self cross-linking, and requires only modest heating (130° C. to 150° C.) to induce the cross-linking process. After addition of the latex the slurry viscosity was adjusted to 634 cps by the addition of a further 200 g of water. The final slurry solids amount was determined to be 19.3 wt %.

Spray-drying was carried out using the same spray-drying apparatus as used in Examples 1-6, with an inlet temperature of 320° C. and outlet temperature of 125-128° C. The dried material was collected for analysis ("Sample A").

A quantity of the material produced was heated in a forced air oven to either 140° C. or 150° C. for 1 hour (referred to as "Sample B" and "Sample C" respectively).

Figure 7A:
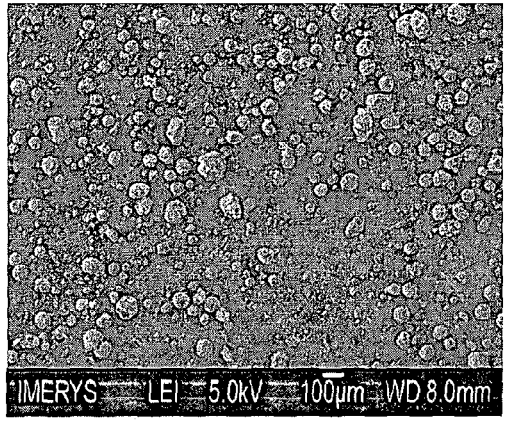
FIGS. 7a and 7b are SEM images of the spray-dried product of Example 9.
Figure 7B:
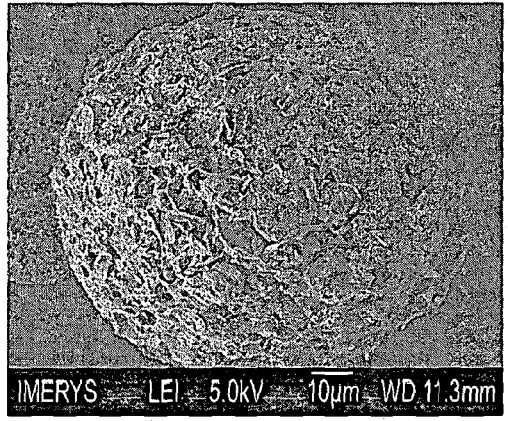
Figure 8A:
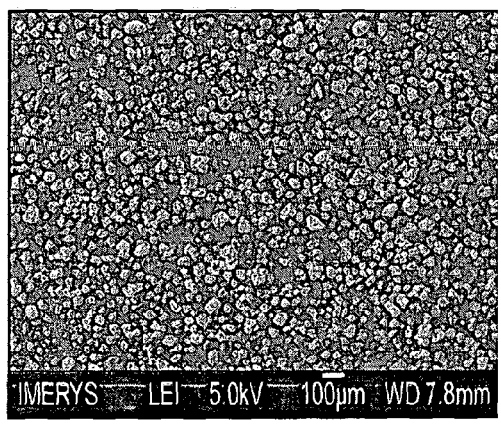
FIGS. 8a to 8d are SEM images of the non-spray-dried granulate of Example 10.
Figure 8B:
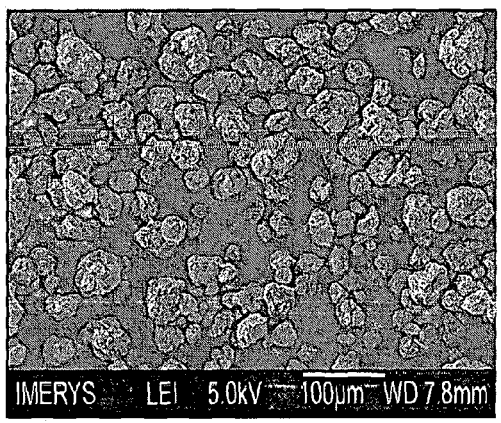
Figure 8C:
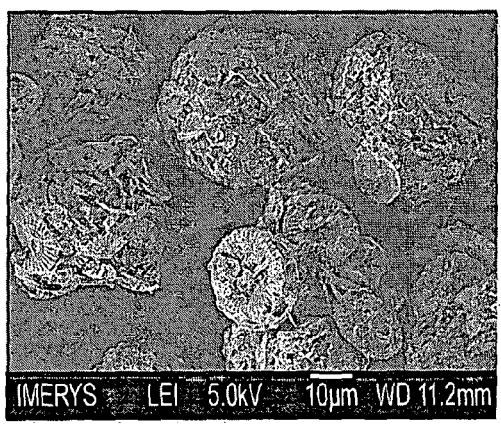
Figure 8D:
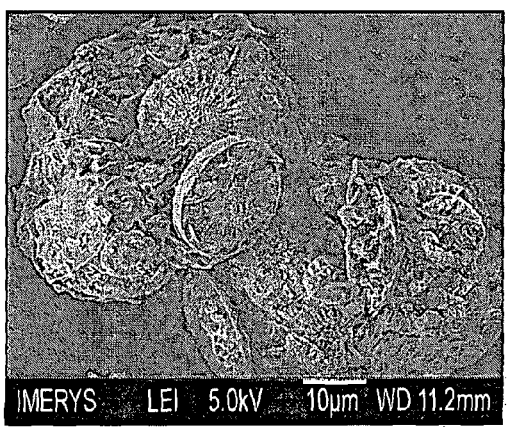

SEM Images of the product were collected showing spherical aggregates typically ~50 μm in diameter (FIGS. 7a and 7b). No visible evidence of the cross-linked polymer was observed.

Particle size distribution determined by laser diffraction method on an aqueous suspension of particles indicated d50 of 88 μm with d10 of 22 μm and d90 of 197 μm.

An estimate of the particle integrity in an aqueous environment was made by preparing a 5 wt % suspension of the material in water and stirring with a magnetic stirrer for four hours. At intervals, the suspension was sampled and particle size analysis was made by laser diffraction. A particle "attrition index" was calculated by comparing the d50 of the sample with the d50 of the feed material. A large value of attrition index maintained over time therefore indicates that the spray-dried particles remain intact. Comparative measurements were made for the materials that had been calcined and their uncalcined precursors. The results obtained are set forth in Table 11 below.

TABLE 11

| | Attrition Index (d50/d50 feed) | | |
|---|---|---|---|
| Sample | 1 hr | 2 hrs | 4 hrs |
| Spray-dried Example 7 | 2.81 | 2.59 | 1.65 |
| Spray-dried Example 6 | 2.63 | 1.76 | 1.60 |
| Example 9, Sample A | 3.81 | 3.01 | 2.05 |
| Example 9, Sample B | 5.01 | 4.38 | 3.44 |
| Example 9, Sample C | 6.00 | 5.20 | 4.00 |
| Spray-dried, calcined Example 4 | 3.42 | 3.26 | 2.94 |
| Spray-dried, calcined Example 8 | 3.80 | 3.50 | 2.69 |

The "attrition index" of the sample spray dried with the permanent binder improved when subjected to additional heat treatment suggesting that not all of the potential cross-linking was achieved during the spray-drying process. The "attrition index" of the permanent binder treated samples was superior to that for the spray dried materials prepared with either the PV-OH (Example 7) or the Dow latex (Example 6) and better than that of the calcined materials. The presence of the cross-linked polymer may impart a certain resilience to the particle that can absorb impact energy.

The filtration capability of a sample of Sample C was measured. Comparison was made with Celite® 535 using the "Ovaltine® test". A pre-coat of C535 was used. The spray-dried experimental filter aid of Sample C was used for both the pre-coat and body feed. The results obtained are set forth in Table 12 below.

TABLE 12

| | SA ($m^2g^{-1}$) | Permeability Darcy | Pressure at 15 mins | Pressure at 30 mins | Clarity (NTU) at 15 mins | Clarity (NTU) at 30 mins |
|---|---|---|---|---|---|---|
| C535 | 0.94 | 2.81 | 1.40 | 1.50 | 19.87 | 14.49 |
| Ex. 9, Sample C | 19.0 | 1.43 | 1.5 | 1.5 | 0.02 | 0.00 |

Tests were also carried out using cloudy apple juice as the filtration challenge in this case comparing with Celite® 545. The results are set forth in Table 13.

TABLE 13

| | Pressure at 0 mins | Pressure at 15 mins | Pressure at 30 mins | Clarity (NTU) at 0 mins | Clarity (NTU) at 15 mins | Clarity (NTU) at 30 mins |
|---|---|---|---|---|---|---|
| C545 | 0 | 0 | 0 | 12.13 | 19.0 | 17.69 |
| Ex. 9, Sample C | 0 | 0 | 1.0 | 8.79 | 3.22 | 1.30 |

Example 10

In this example, porous sold bodies were prepared from the spray-dried granulates of Examples 3, 4 and 5, and then calcined.

"Green" (i.e. unfired) pre-forms were prepared using a stainless steel die set, either 30 or 50 mm diameter, fitted to a uniaxial hydraulic laboratory press operated at a series of hydraulic pressures.

The thickness of the green pre-form was controlled by the mass of spray dried granulate used. Typically 5 to 15 g was used.

The green pre-forms were fired in a laboratory muffle furnace at 2° C./minute to a temperature of 1100° C. with a 1 hour dwell period before cooling at 10° C./minute to room temperature. Fired diameters of discs prepared with the 30 mm die set were typically 29 mm whilst those from the 50 mm die set were approximately 48 mm after firing.

The bulk density of the fired bodies was measured and is set forth in Table 14 below.

TABLE 14

| Spray-dried granulate | Hydraulic pressure (MPa) | Fired density (g/cm³) |
|---|---|---|
| Example 3 | 2.50 | 0.490 |
| | 2.75 | 0.479 |
| | 4.99 | 0.563 |
| | 6.96 | 0.576 |
| Example 4 | 2.50 | 0.413 |
| Example 5 | 2.75 | 0.465 |
| | 6.96 | 0.534 |

Micrographs were obtained for fractured surface cross-sections (see FIGS. 9a and 9b) and embedded polished cross-section (FIG. 10) of the sintered disc prepared from a pre-form made at a pressure of 2.5 MPa. The SEM images reveal that the spherical spray-dried particles are slightly distorted by the uniaxial pressing process. Significant inter-particle and intra-particle voids are evident.

Figure 11:
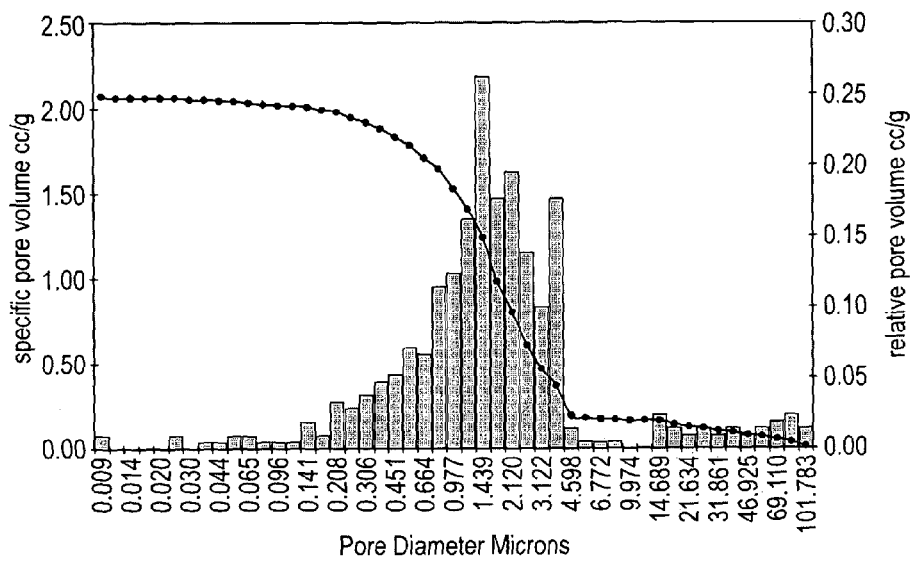
FIG. 11 is a graph showing the pore size distribution of the sintered disc of Example 11.

The pore size distribution of a sintered disc from a pre-form compressed to 2.5 MPa is shown in FIG. 11. The data shows that the mean pore diameter is 1.67 µm. A total pore volume of 2.07 cc/g was recorded.

The permeabilities of the sintered discs made from the spray-dried granulates of Examples 3 and 5 were determined in the manner set forth above. The results obtained are set forth in Table 15.

TABLE 15

| | Density (g/l) | Thickness (cm) | Permeability (Darcy) |
|---|---|---|---|
| Example 5 | 437.89 | 1.090 | 0.982 |
| Example 3 | 507.50 | 0.987 | 0.066 |

A significant difference was seen in the permeability of the discs which may be related to the different levels of temporary binder in the spray dried granulates used to prepare the discs.

The filtration performance of the sintered disc made from Example 5 (pressed at 2.75 MPa) was evaluated using the "Ovaltine®" test as described above. The experimental conditions were as follows.

Control 1: Celite® HSC 2 g pre-coat, 6 liters/30 g Ovaltine®/12 g HSC, 120 mls/min Control 2: Celite® HSC 7.4 g pre-coat, 6 liters/30 g Ovaltine®, 30 mls/min DE Disc: 6 liters/30 g Ovaltine®, 120 mls/min. Disc mounted within a plastic ring to allow sealing in apparatus without damage to disc.

The results obtained are set forth in Table 16.

TABLE 16

| Control 1 | | | Control 2 | | | DE Disc | | |
|---|---|---|---|---|---|---|---|---|
| Time (min) | Pressure (bar) | Clarity (NTU) | Time (min) | Pressure (bar) | Clarity (NTU) | Time (min) | Pressure (bar) | Clarity (NTU) |
| 0 | 0 | | 0 | 1.50 | | 0 | 1.4 | |
| 5 | 0.21 | | 5 | 1.50 | | 5 | 1.41 | |
| 10 | 0.61 | | 10 | 1.50 | | 10 | 1.41 | |
| 15 | 0.95 | 32.05 | 15 | 1.50 | 25.41 | 15 | 1.41 | 5.38 |

TABLE 16-continued

| | Control 1 | | | Control 2 | | | DE Disc | |
|---|---|---|---|---|---|---|---|---|
| Time (min) | Pressure (bar) | Clarity (NTU) | Time (min) | Pressure (bar) | Clarity (NTU) | Time (min) | Pressure (bar) | Clarity (NTU) |
| 20 | 1.15 | | 20 | 1.50 | | 20 | 1.41 | |
| 25 | 1.21 | | 25 | 1.50 | | 25 | 1.41 | |
| 30 | 1.30 | 19.11 | 30 | 1.50 | 20.44 | 30 | 1.41 | 10.83 |
| 35 | 1.30 | | 35 | 1.50 | | 35 | 1.21 | |

Figure 12A:
FIGS. 12a and 12b are photographs of the filter cakes from the controls in Example 11.

In the test of Control 1 a cake developed that was 11.7 mm thick, dark brown in colour with a light underside (see FIG. 12a).

Figure 12B:
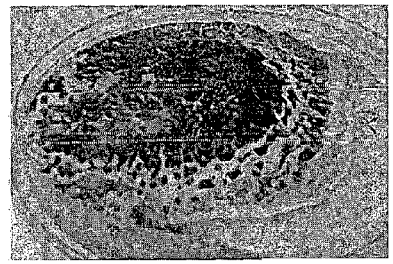

In the test of Control 2, it took 5 minutes to collect the sample of filtrate. Because the cake would take too long to drain properly, it was removed whilst it was still quite wet (FIG. 12b). The thickness before removal was approximately the same as for Control 1.

Figure 12C:
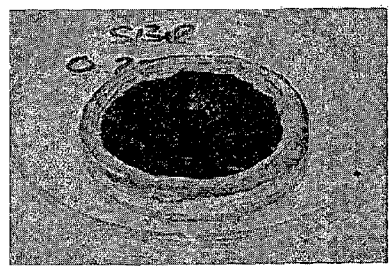
FIGS. 12c and 12d are photographs of the filter cake and filter disc (top side and underside respectively) from the filtration experiment in Example 11 using the sintered disc filter of the invention.
Figure 12D:
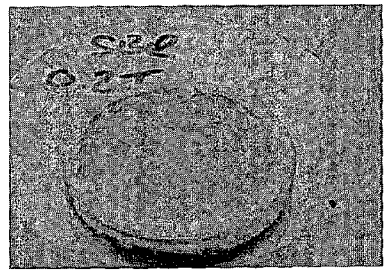

Using the diatomaceous earth disc of the invention a flow rate of 50 mls/minute was achieved. The clarity was very good compared to the controls. Photographs of the control cakes and the disc post-testing are shown in FIGS. 12c (top side) and 12d (underside). Fracturing the disc revealed that the Ovaltine® had penetrated only a little way into the matrix and was mostly retained at the surface.

APPENDIX A

Walton Filtration Method

Equipment and Materials
Equipment:

| Apparatus/ Instrument | Manufacturer | Type | Model # |
|---|---|---|---|
| Balance | NA | Accurate to 0.01 g | N/A |
| Spatula | NA | NA | N/A |
| Walton Filter | Betts Advanced | Euro or Standard | N/A |
| Magnetic Mixing Plate | Cole-Parmer or equivalent | 6" × 6" 1500 rpm | 4810 |
| Turbidimeter | Hach or equivalent | 90 degree scatter | 2100N or 2100AN |
| Peristaltic Pump | Masterflex | Capable of 150 mL/min | N/A |
| 2 Liter Beaker | Pyrex or equivalent | Glass | N/A |
| 2 × 250 mL Erlenmeyer | Pyrex or equivalent | Glass | N/A |
| Filter Screens of Varying Aperture | Cole Palmer or equivalent | Polypropylene or Nylon monofilament | N/A |

Reagents:

| Reagent | Grade | Shelf Life | Manufacturer/ Supplier | Part Number |
|---|---|---|---|---|
| American Ovaltine ® | Chocolate | 1 year | Ovaltine ® USA | N/A |
| Water | DI | N/A | N/A | N/A |

Procedure
1. Assembling the filter:
(i) Begin by filling all the pump tubing with distilled water by running the pump at 150 mL/min and alternating the inlet valve, (if present), until no air pockets remain.
(ii) Place a filter cloth over the support screen, place the rubber gasket above it, and mount the Walton Filter in place. If the filter is non-rigid, (i.e. nylon, polypropylene, paper, etc), make sure that the support screen's aperture is small enough that it will not deform during the test. Deformations in the filter will increase the aperture size. The aperture of the filter septum used should be slightly smaller than the d90% of the filter aid under test.
(iii) By looking through the opening on the top, ensure that the rubber gasket is centered, then tighten the wing nuts on the bottom of the filter.
(iv) Attach the outlet from the pump to the inlet of the Walton filter. Attach the tube leading to the bottom of the turbidimeter flow cell to the filter outlet. Let the tube attached to the top of the turbidimeter flow fall below the level of the Walton Filter, (such as to a nearby sink), to allow for drainage by gravity.
(v) Run the pump at 150 mL/min to begin filling the pump.
(vi) Once water begins flowing through the turbidimeter, lift the tube attached to the top of the flow cell above the height of the Walton filter and allow it to fill completely.
(vii) When the water is about to overflow place the cap on the filter and screw it tight. Align the Walton filter so the bleed valve (if fitted) is at the highest point and any air left in the filter is right below it. Then open the bleed valve to remove the last of the air from the chamber. When all the air is gone, close the valve again and set the filter upright. If the Walton Filter model is not fitted with a bleed valve, partially unscrew the top cap until all air is expelled. The filter should also be inverted to ensure no air is hiding in cavities or trapped beneath the filter.
(viii) As water flows through the filter, the turbidity should slowly drop. To speed up the process and gather any particles that may have settled in the flow cell, close and open the exit valve from the Walton filter in short 1 second pulses. This allows pressure to build up and a rush of fluid to help carry particles away but will cause the turbidity to temporarily increase. Continue this process until the turbidity is below 1 NTU and does not rise above 3 NTU after pulsing.
2. Precoat:
(i) Make a precoat of 1 kg/m² filter surface area by slurrying 2.0 g of the filter aid under test in about 150 mL of water in a beaker. Place a magnetic stirbar in the slurry and keep it mixing on a plate at a low setting.
(ii) If running with computer assisted data collection, begin logging the pressure and turbidity. If logging by hand, note the pressure and take a sample of the water leaving the filter to note the initial turbidity. Transfer the inlet tube to the precoat slurry. Be sure to pinch the tube so air bubbles will not get sucked into the line.
(iii) As soon as the transfer of the inlet tube has been made, place the outlet tube also into the precoat slurry to recycle the flow. Continue to recycle until you can clearly see a finger through the chamber of the Walton filter. At this point the turbidity should be leveling out. If this step takes more than 15 minutes or the turbidity levels out and the chamber is not clear, then there is a problem with the setup. Either there is a leak (e.g. if the wing nuts are not tight enough or the gasket is not centered) or the filter screen is too open or damaged.

3. Body Feed:
(i) To make a body feed, make a solution of 5 g/L American Chocolate Ovaltine® and 2 g/L filter aid. 1.5 L is needed for calcined and natural grades and 4 L is needed for flux calcined grades due to the increased flow during the test. Keep this solution mixing fast so the filter aid doesn't settle out and the Ovaltine® remains evenly dispersed.
(ii) Just as in the precoat step, transfer the inlet tube to the body feed slurry, pinching the tube to avoid air bubbles, and start a 60 second timer. Move the outlet tube from the precoat slurry to a sink or 2 L collection beaker. Once in place, try not to disturb the height of the outlet tube. Raising or lowering the outlet can significantly affect the pressure.
(iii) When 60 seconds has passed, lower the feed rate, (to 30 mL/min for calcined and natural grades or 124 mL/min for flux calcined grades), and begin logging the pressure and turbidity. Take this as time 0 and record values every 5 minutes thereafter.
(iv) After 35 minutes stop logging data and turn off the pump. If the pressure has reached or exceeded 30 psi before the 35 minutes has been reached, stop the trial prematurely and record the data.

4. Clean Up:
(i) When you are finished, run an abundance of cold water through all sections of the filter and tubing to ensure that no Ovaltine® solution is left in any part of the system. Solution left in tubes and cuvets will settle and adhere to the surface making it very difficult to get accurate turbidity readings on future tests.

2.0 Reporting

The filtration efficiency of the sample can be assessed by comparing the results against a reference sample of the same permeability. Permeability must be measured by a direct method, such as the VEL test. The benchmark should be as close as possible to the darcy permeability of the sample under test and not different by more than 2%. The benchmark can be adjusted in permeability if necessary by adding a proportion of a filter aid grade from the same source but of higher or lower permeability in order to give a fine adjustment to the darcy value.

The invention claimed is:

1. A method of making a diatomaceous earth granulate, the method comprising:
    spray-drying a suspension comprising particles of diatomaceous earth, a liquid medium, and a binder, wherein inorganic solids in the suspension comprise at least 80 wt % diatomaceous earth; and
    recovering a diatomaceous earth spray-dried granulate.

2. The method according to claim 1, wherein the solids in the suspension comprise at least 90 wt %.

3. The method according to claim 1, wherein the binder is a temporary binder.

4. The method according to claim 1, further comprising calcining the spray-dried granulate.

5. The method according to claim 1, wherein the binder is a permanent binder.

6. The method according to claim 1, further comprising:
    forming the spray-dried granulate into a shaped body; and
    calcining the shaped body.

7. The method according to claim 4, wherein the calcining is carried out at a temperature of at least 600° C.

8. The method according to claim 4, wherein the calcining is carried out at a temperature of at least 800° C.

9. The method according to claim 4, wherein the calcining is carried out at a temperature of at least 900° C.

10. The method according to claim 6, wherein the calcination is performed for no more than 4 hours at peak calcination temperature.

11. A granular diatomaceous earth product obtained by the method of claim 1, wherein the granular diatomaceous earth product comprises substantially spherical granules, each having a shell comprising diatomaceous earth surrounding a hollow core.

12. The product according to claim 11, wherein the granular diatomaceous earth product is in the form of a free-flowing granulate.

13. The product according to claim 11, wherein the granules have a $d_{50}$ ranging from 10 μm to 250 μm.

14. The product according to claim 11, wherein the granules have a $d_{50}$ ranging from 20 μm to 100 μm.

15. The product according to claim 11, wherein the granular diatomaceous earth product has a permeability of at least 1.0 Da.

16. The product according to claim 11, wherein the granular diatomaceous earth product has a permeability of at least 3.0 Da.

17. A diatomaceous earth product obtained by the method of claim 4, wherein the said diatomaceous earth product comprises a mass of substantially spherical spray-dried granules formed into an integral body.

18. The diatomaceous earth product according to claim 17, wherein adjacent granules in the body are sintered to each other.

19. A method of filtering a liquid comprising:
    passing the liquid through a filter comprising the product according to claim 11.

20. The method according to claim 19, wherein the method is performed without the aid of a pre-coat.

21. A method of using a product according to claim 11, the method comprising using the product as a filter aid or in filtration.

22. A method of filtering a liquid, the method comprising:
    passing the liquid through a filter comprising at least one of granules of spray-dried diatomaceous earth or a shaped body formed from granules of spray-dried diatomaceous earth.

* * * * *